US011968747B2

(12) United States Patent
Kreishan

(10) Patent No.: US 11,968,747 B2
(45) Date of Patent: Apr. 23, 2024

(54) MOBILE CARRIER APPLICATION REGISTRATION

(71) Applicant: Charter Communications Operating, LLC, St. Louis, MO (US)

(72) Inventor: Loay Kreishan, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 333 days.

(21) Appl. No.: 17/245,108

(22) Filed: Apr. 30, 2021

(65) Prior Publication Data

US 2022/0353669 A1 Nov. 3, 2022

(51) Int. Cl.
*H04W 8/24* (2009.01)
*G06F 16/245* (2019.01)
*H04W 12/041* (2021.01)
*H04W 12/37* (2021.01)

(52) U.S. Cl.
CPC ............ *H04W 8/24* (2013.01); *G06F 16/245* (2019.01); *H04W 12/041* (2021.01); *H04W 12/37* (2021.01)

(58) Field of Classification Search
CPC ..... H04W 8/24; H04W 12/041; H04W 12/37; H04W 8/02; H04W 60/04; G06F 16/245; H04L 61/503; H04L 61/5014
See application file for complete search history.

(56) References Cited

U.S. PATENT DOCUMENTS

| 7,792,963 | B2 | 9/2010 | Gould |
| 2003/0056217 | A1 | 3/2003 | Brooks |
| 2006/0130107 | A1 | 6/2006 | Gonder et al. |
| 2007/0217436 | A1 | 9/2007 | Markley |
| 2009/0248794 | A1 | 10/2009 | Helms |
| 2010/0313236 | A1 | 12/2010 | Straub |
| 2016/0337786 | A1* | 11/2016 | Kafle ................ H04L 63/10 |
| 2017/0126675 | A1* | 5/2017 | Yin .................. H04L 63/083 |
| 2019/0166633 | A1* | 5/2019 | Koshimizu ....... H04L 65/1069 |
| 2019/0334884 | A1* | 10/2019 | Ross .................. G06F 21/41 |
| 2021/0184841 | A1* | 6/2021 | Shpurov ........... H04L 9/3265 |

(Continued)

OTHER PUBLICATIONS

Chris Parker, Owner, About WhatIsMyIPAddress.com, downloaded Mar. 3, 2021 from https://whatismyipaddress.com/about, 10 pages.

(Continued)

*Primary Examiner* — Mazda Sabouri
(74) *Attorney, Agent, or Firm* — Otterstedt & Kammer PLLC

(57) ABSTRACT

At a core system of a carrier, obtain, from a carrier application on a mobile device of a subscriber of the carrier, a registration request including a unique internet protocol address of the mobile device and a public key generated by the carrier application from an application certificate of the carrier application. Based on the unique internet protocol address, the core system accesses a database record to retrieve a unique application identifier corresponding to the unique internet protocol address of the mobile device. Send, from the core system of the carrier, to the carrier application on the mobile device of the subscriber of the carrier, a registration request response including the unique application identifier and the public key.

32 Claims, 14 Drawing Sheets

(56) References Cited

U.S. PATENT DOCUMENTS

2021/0336966 A1* 10/2021 Gujarathi .............. H04L 9/3247

OTHER PUBLICATIONS

Sarp Köksal, Nov. 12, 2019, Evolution of Core Network(3G vs. 4G vs. 5G), downloaded Apr. 9, 2021 from https://medium.com/@sarpkoksal/core-network-evolution-3g-vs-4g-vs-5 . . . , 15 pages.
Mobile IP—Wikipedia, downloaded Mar. 12, 2021 from https://en.wikipedia.org/wiki/Mobile_IP, 5 pages.
Mobile network operator—Wikipedia, downloaded Mar. 12, 2021 from https://en.wikipedia.org/wiki/Mobile_network_operator, 2 pages.
Operations support system—Wikipedia, downloaded Mar. 12, 2021 from https://en.wikipedia.org/wiki/Operations_support_system, 5 pages.
Progression from 4G to 5G | Netmanias, downloaded Apr. 9, 2021 from https://www.netmanias.com/en/post/blog/14214/5g/progression-from-4g- . . . , 4 pages.
What Is My IP Address—See Your Public Address—IPV4 & IPv6, downloaded Mar. 12, 2021 from https://whatismyipaddress.com/, 7 pages.

* cited by examiner

MOBILE CARRIER APPLICATION REGISTRATION

FIELD OF THE INVENTION

The present invention relates generally to the electrical, electronic and computer arts, and, more particularly, to wireless mobile telephony and the like.

BACKGROUND OF THE INVENTION

One type of third-party application ("app") for mobile devices is the so-called over-the-top app. The installation, activation, and function of such apps is typically controlled by the operating system of the mobile device (e.g., iOS® (registered mark of Cisco Technology, Inc., San Jose, CA, US), Android® (registered mark of GOOGLE LLC MOUNTAIN VIEW, CA, US)). These third-party apps typically reside in a directory where they have an extremely limited function, declared by the developers of the app, and where they do not have visibility to other elements running on the mobile device. This category of apps includes gaming; utility apps; business applications such as word processing, presentation graphics, spreadsheets; and the like.

There is another set of apps that are called carrier apps. These are apps that are developed by service providers (e.g., MNOs (mobile network operators) such as Verizon® (registered mark of VERIZON TRADEMARK SERVICES LLC, Washington, D.C., US), AT&T® (registered mark of AT&T INTELLECTUAL PROPERTY II, L.P. AT&T INTELLECTUAL PROPERTY LLC., RENO, NEVADA, US), and T-Mobile® (registered mark of Deutsche Telekom AG Bonn, FED REP GERMANY) and/or mobile virtual network operators (MVNO)) such as Spectrum® (registered mark of CHARTER COMMUNICATIONS HOLDING COMPANY, LLC, ST. LOUIS, MO, US), and the like. Wireless communications services providers in all forms, including but not limited to MNOs and MVNOs, generally have a close relationship with the device manufacturers. The device manufacturers allow these carrier apps to reside in a different directory than over-the-top apps, with elevated permissions, security, and so on. These carrier apps have more functionality and visibility to the device and to the service provider, than do third-party apps obtained through the Apple® Store (registered mark of APPLE INC. Cupertino, CA, US) or Android® Store and downloaded over-the-top.

A carrier application is an app provided by cellular providers to provision and manage network configurations on a mobile device. Traditionally, carrier apps are loaded and installed on the device during the manufacturing process, or during set-up of service on a mobile device, through a wireless interface. Carrier applications utilize device identifiers, such as International Mobile Equipment Identity (IMEI), or subscriber identifiers, such as International Mobile Subscriber Identity (IMSI), to identify the mobile device and register the carrier application with back-end management and configuration systems.

Recently, increased privacy rules that require subscriber permission/consent have made it more difficult for carriers to obtain device information and subscriber information, required by the carrier app, in a seamless manner. Thus, currently, most applications cannot identify the mobile device without device or user permissions.

SUMMARY OF THE INVENTION

Principles of the invention provide techniques for mobile carrier application registration. In one aspect, an exemplary method includes obtaining, at a core system of a carrier, from a carrier application on a mobile device of a subscriber of the carrier, a registration request including a unique internet protocol address of the mobile device and a public key generated by the carrier application from an application certificate of the carrier application; based on the unique internet protocol address, the core system accessing a database record to retrieve a unique application identifier corresponding to the unique internet protocol address of the mobile device; and sending, from the core system of the carrier, to the carrier application on the mobile device of the subscriber of the carrier, a registration request response including the unique application identifier and the public key.

In another aspect, an exemplary system includes a memory; and at least one processor, coupled to the memory, and operative to: obtain, from a carrier application on a mobile device of a subscriber, a registration request including a unique internet protocol address of the mobile device and a public key generated by the carrier application from an application certificate of the carrier application; based on the unique internet protocol address, access a database record to retrieve a unique application identifier corresponding to the unique internet protocol address of the mobile device; and send, to the carrier application on the mobile device of the subscriber, a registration request response including the unique application identifier and the public key.

In still another aspect, an exemplary system includes an application server; a network record database coupled to the application server; and a billing server coupled to the network record database. The network record database is configured to assign a unique internet protocol address to a mobile device of a subscriber; and the application server is configured to obtain, from a carrier application on a mobile device of a subscriber, a registration request including the unique internet protocol address of the mobile device and a public key generated by the carrier application from an application certificate of the carrier application. Further, the application server is configured to, based on the unique internet protocol address, access a database record in the network record database to retrieve a unique application identifier corresponding to the unique internet protocol address of the mobile device; and the application server is configured to send, to the carrier application on the mobile device of the subscriber, a registration request response including the unique application identifier and the public key.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine-readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., carrier core system, cellular device, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

- improves technological process of wireless telephony by allowing mobile carrier app to obtain needed mobile device information in a manner consistent with state-of-the art privacy and security rules
- Allow the mobile carrier app to identify the subscribed devices within specific networks that belong to and are operated by the carrier These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
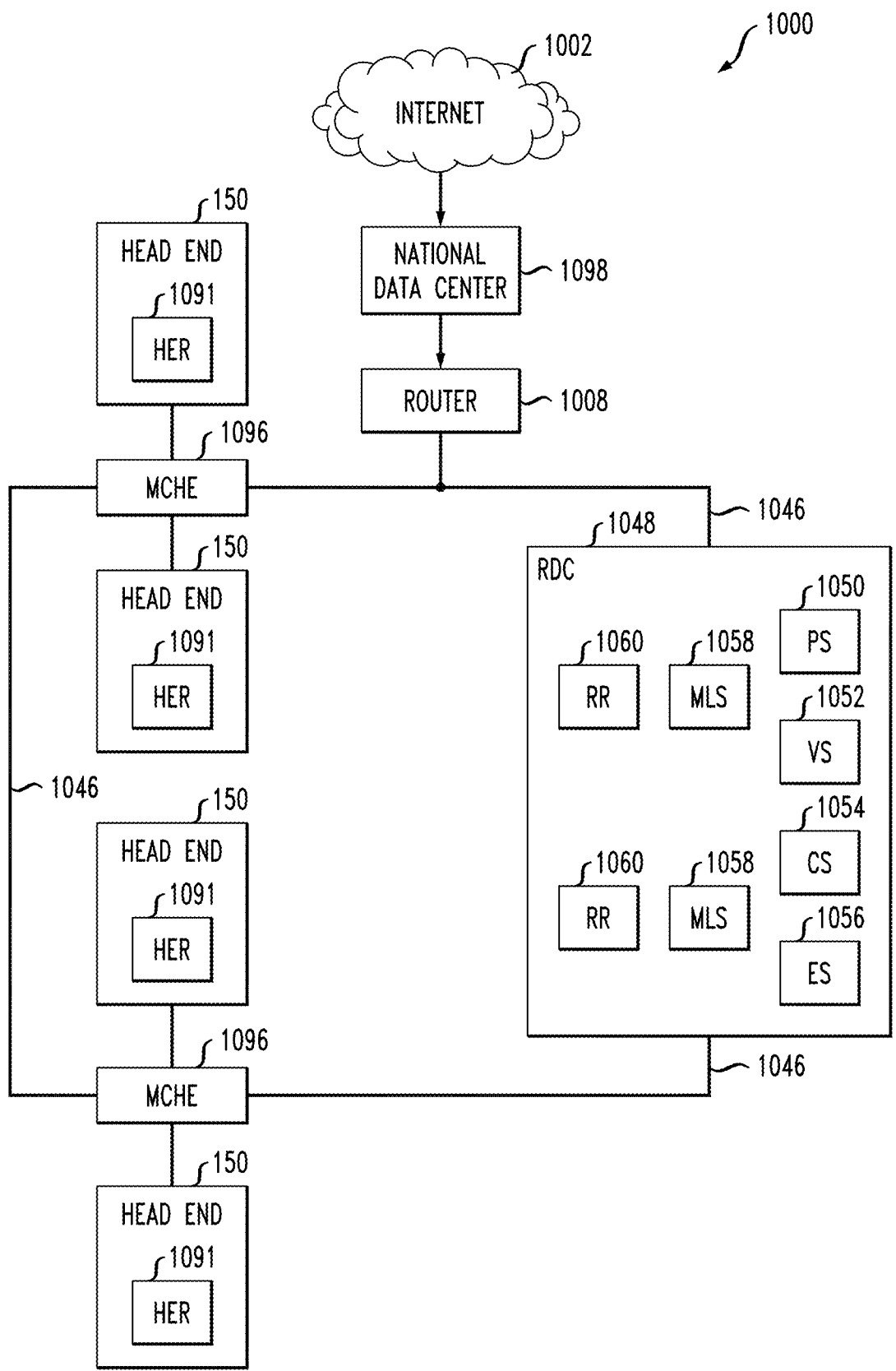
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
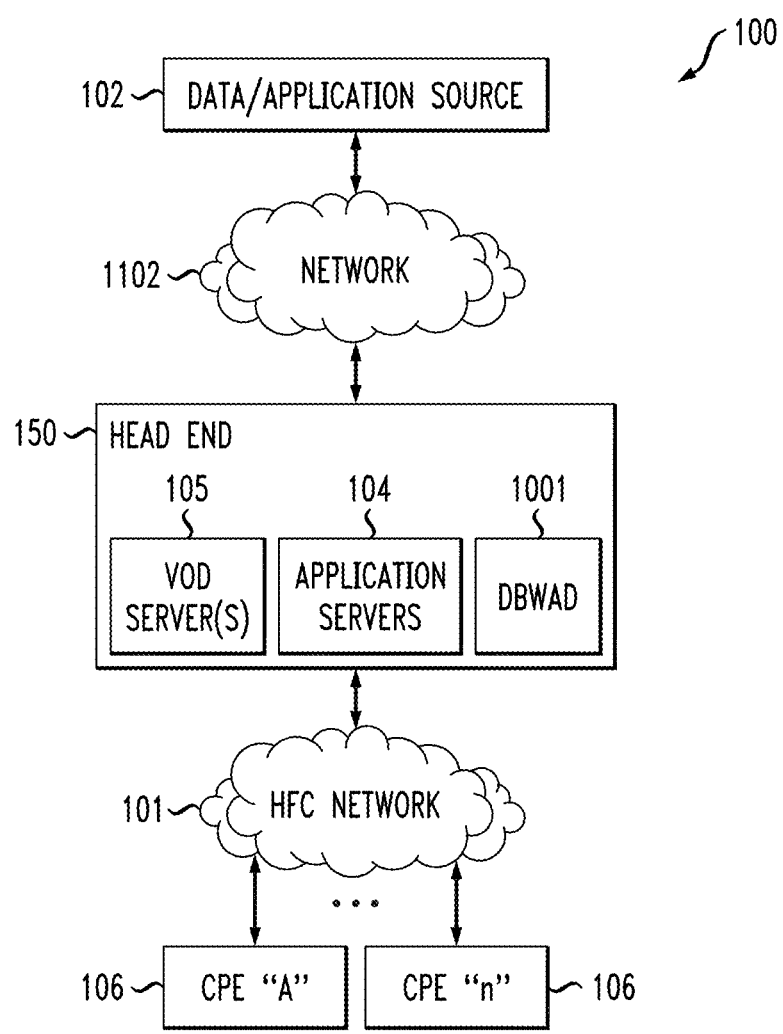
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUS (S-ONUS; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g., FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
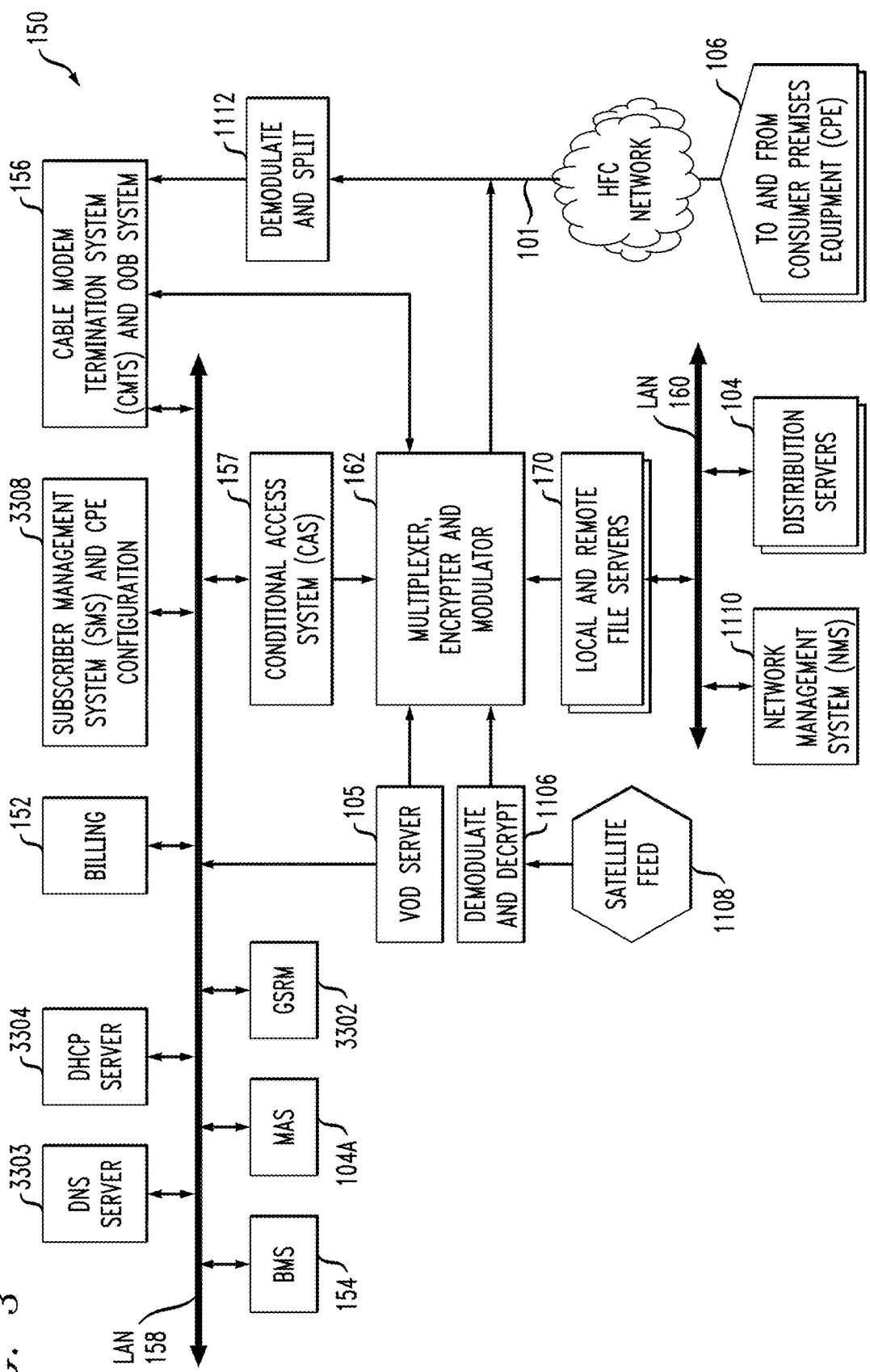
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

It should be noted that the exemplary architecture in FIG. 3 shows a traditional location for the CMTS 156 in a head end. As will be appreciated by the skilled artisan, CMTS functionality can be moved down closer to the customers or up to a national or regional data center or can be dispersed into one or more locations.

Figure 4:
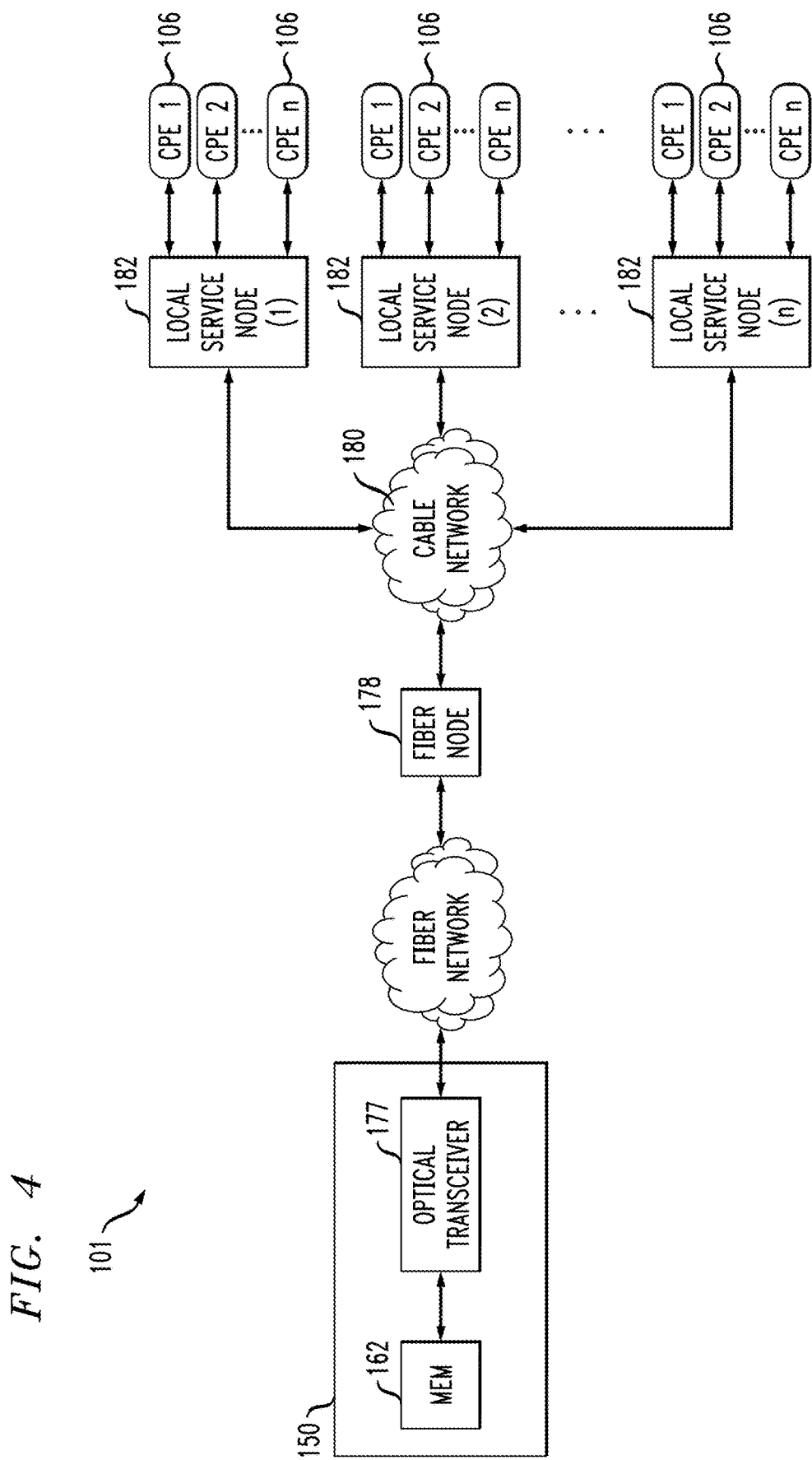
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOC SIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001. US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
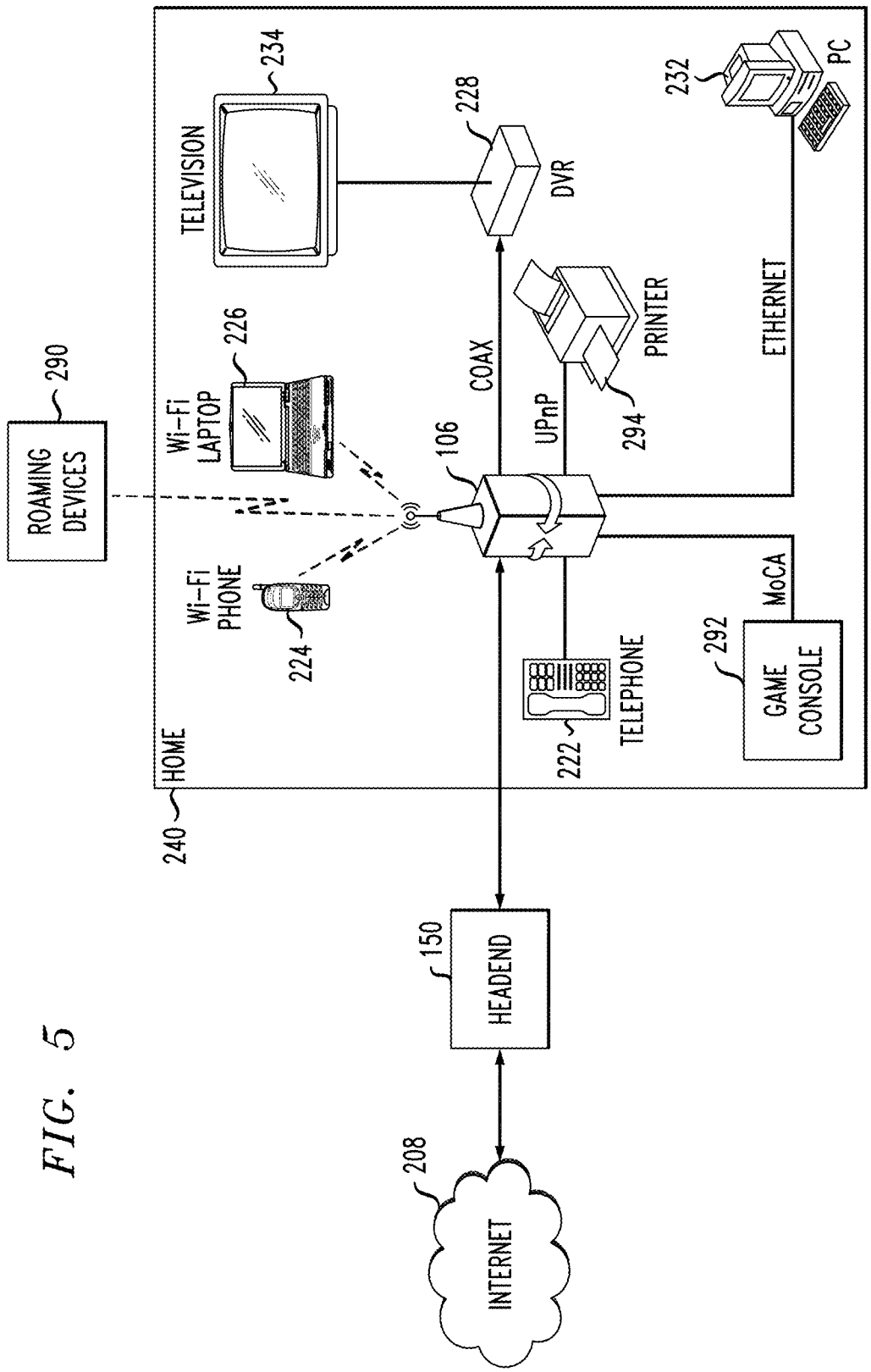
FIG. 5 is a functional block diagram of a premises network, including an exemplary centralized customer premises equipment (CPE) unit, interfacing with a head end such as that of FIG. 3.
Figure 6:
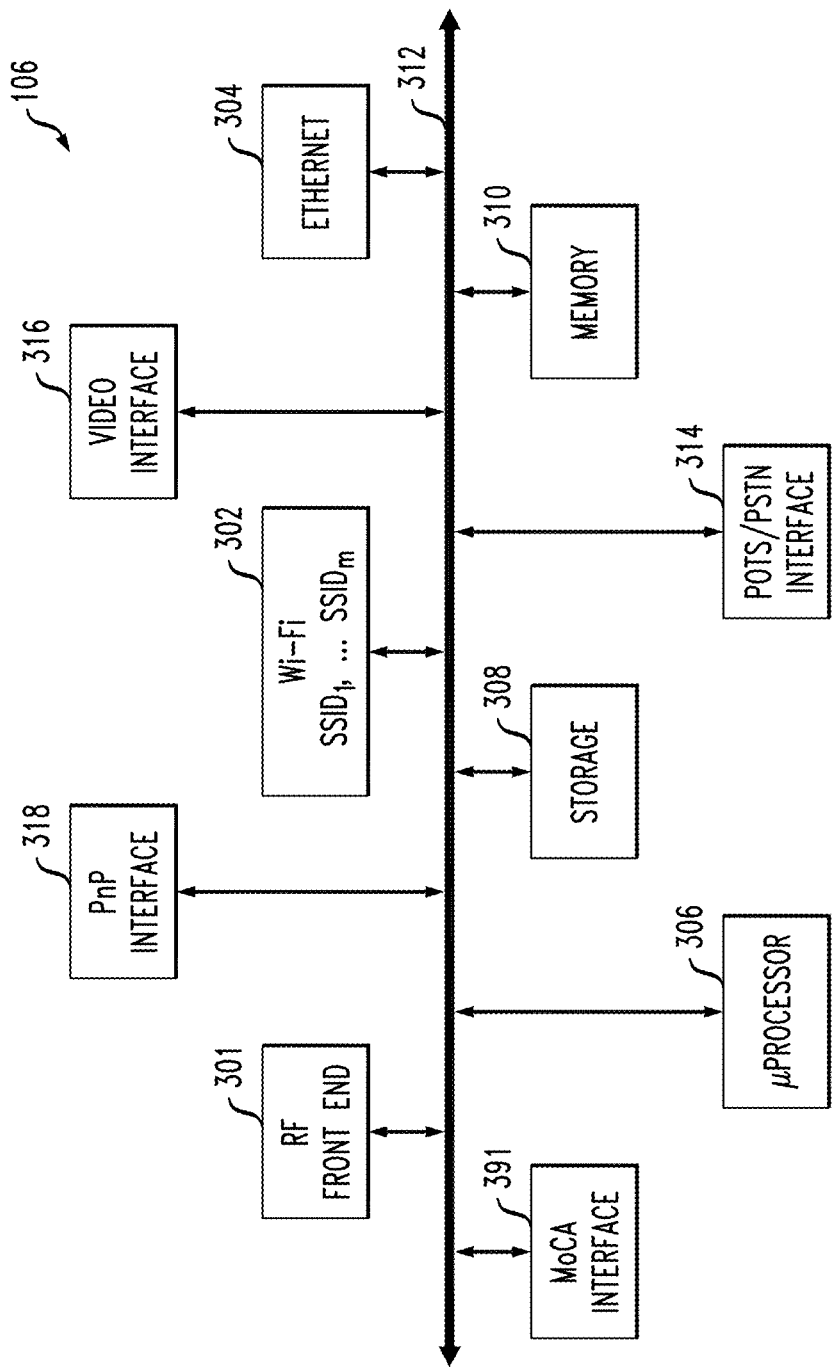
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floorstanding, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g., Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
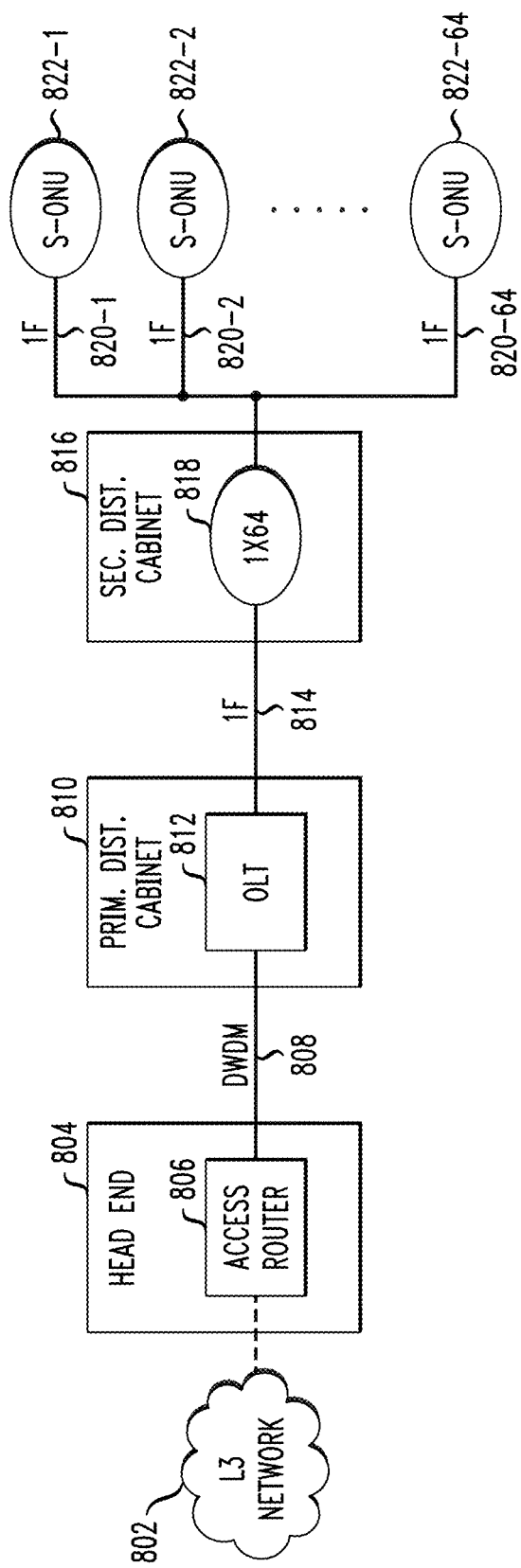
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
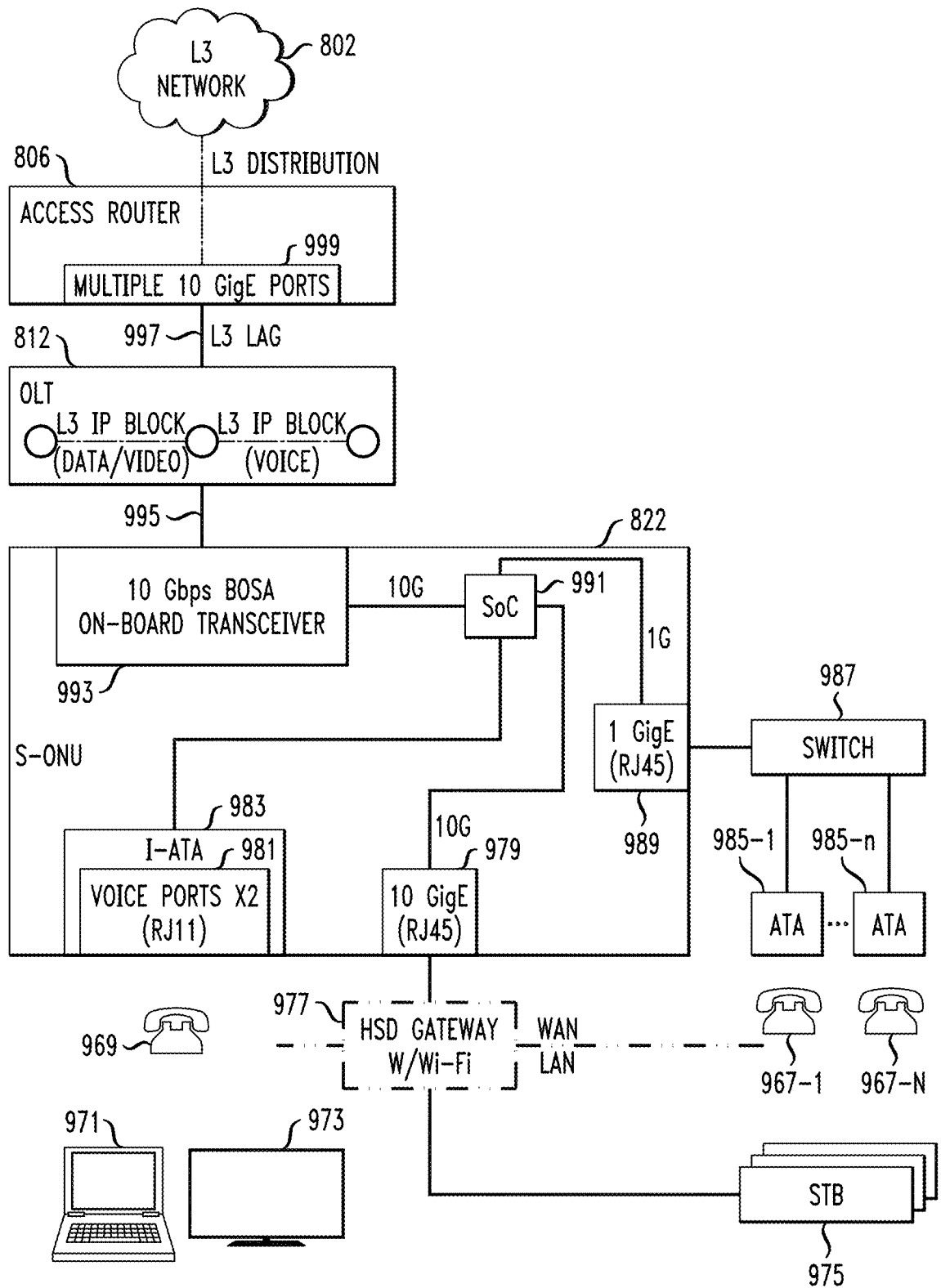
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. Furthermore, one or more embodiments could be adapted to situations where a cable/fiber broadband operator provides wired broad band data connectivity but does not provide QAM-based broadcast video.

Principles of the present disclosure will be described herein in the context of apparatus, systems, and methods for mobile carrier application registration. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As noted, the carrier app typically resides in a directory with higher security permissions than any over-the-top app. The carrier app is typically factory-installed when the device is manufactured as part of the device software bundle. Heretofore, carrier apps read device-identifying information (e.g., IMEI) directly from the device. As will be appreciated by the skilled artisan, IMEI is, in essence, a serial number for the subscriber identity module or subscriber identification module (SIM card) (or eUICC (Embedded Universal Integrated Circuit Card) which has been dubbed the next evolution of the SIM card). Historically, when the user activates the phone and uses the set-up wizard, the carrier app is initiated, reads information from the device, and registers with the back-end system using the information it obtained from the mobile device Recently, device vendors are emphasizing privacy and security, to help prevent third-party attacks against the subscriber, such as by tracking location, usage, sites visited, etc. Strong privacy protection rules now prevent most apps, including carrier apps, from reading information off the mobile device. Under new privacy rules, operating system providers and device manufacturers block any app (even carrier apps) from reading this information (e.g., IMEI, IMSI, media access control address (MAC address) of the device). This makes it very difficult for the carrier app to register the device and identify the device that the carrier app is residing on. This is desirable from the standpoint of protecting the privacy of the mobile subscriber; however, it is important to the carrier app to be able to identify the device; e.g., "this device belongs to John Smith and has this service," so that appropriate polices can be activated. It is worth noting that services and policies can typically be applied and activated across the carrier's networks (e.g., cellular, Wi-Fi and others). The initial registration is typically carried out when the device logs on to the home network; however, once the registration is complete and the ID has been assigned, the ID can be used for identification even when the device roams.

One or more embodiments employ a two-part process. A first part includes registration when the phone is first activated. For example, within a set-up wizard, the phone will latch to the cell network (e.g., 4G/5G). The network assigns an IP address. After the set-up wizard invokes the app to start, the app uses that IP address to register. When registration is completed, then the app obtains the unique ID from the app server. Going forward, regardless of what network the device connects to, whether home carrier or roaming, the app still uses that unique ID from the app server to register back to the home network. In a roaming scenario, the app can send an interim update to the home network indicating that the device is on a roaming network, and providing the ID. The home network can identify that ID. If two carriers have a roaming agreement, the device can be identified using the ID.

It will be appreciated that the privacy rules, while desirable for the end-user, pose challenges from the standpoint of a carrier and its carrier app. Indeed, device OEMs generally support enhanced privacy for the subscriber. However, this negatively impacts the service provider's ability to activate devices, run policies on the devices (e.g., what to do if data usage is exceeded), and so on. Also, it is desirable to do offloading (offload devices onto public Wi-Fi). Furthermore in this regard, the device information will typically change when a device moves across multiple types of networks provided by the carrier. For example, with privacy MAC randomization, the carrier will not be able to identify the mobile device when it moves the data link to a Wi-Fi network. Thus, the carrier cannot onboard the device and implement or enforce polices. One or more embodiments advantageously provide convenient new methods to identify and register the device while maintaining end-user privacy and security.

As an aside, regarding Wi-Fi, FIG. 5 shows exemplary Wi-Fi connection to devices within premises in the context of an HFC network; FIG. 9 (see element 977) illustrates that Wi-Fi aspects can also be implemented in an all-fiber implementation.

Now continuing, most applications running on mobile devices maintain the capability to discover which network interface is in use and the IP address of the interfaces on the device. Most mobile devices, when they connect to the cellular network, obtain both an IPv6 address and an IPv4 address. The IPv4 is usually dynamic. IPv6, however, is fixed and stable to the device. By using the Public IP address or the IPv6 address assigned to the mobile device, the mobile application can utilize this information to identify the device and register with the application server. As discussed elsewhere herein, in one or more embodiments, the IP address that is employed should be unique. In one or more embodiments, the carrier application can identify the IPv6 on the device and use the cellular IPv6 address to identify the device to the back-end systems during the application registration process. The back-end systems coordinate the IPv6 address of the mobile device provided by the application with the network records for latched devices, in order to pull additional device information such as the IMEI and IMSI; service information such as subscribed plan and policies; and user information such as account ID. Thus, one or more embodiments utilize information already available on the back-end system (e.g., network Operations Support Systems (OSS)), and correlate that information with information available from the carrier app. Instead of the carrier app reading information off the device and registering with the back-end system, one or more embodiments advise the carrier app which device the app is on by utilizing the IPv6 address that is on the mobile device.

As will be appreciated by the skilled artisan, Operations Support Systems (OSS) are computer systems used by telecommunications service providers to manage their networks (e.g., telephone networks). They support management functions such as network inventory, service provisioning, network configuration and fault management. As will be appreciated by the skilled artisan, the OSS is a specific non-limiting example, and in general, a suitable back-end system or network management system can provide functionality as described with respect to element 1033, within, for example, different generations of cellular and/or Wi-Fi technology.

Use of the IPv6 address is advantageous in the current environment of enhanced concern for privacy and security, because device OEM vendors will not block the app from obtaining this IPv6 information. In general, use of a static IP address is appropriate—this can be static IPv4 or IPv6. Apps need to connect to the Internet and need to know the IP address they are using to reach the Internet. If this information is blocked, or the mobile device is using a private IP address, the app can obtain the public IP address from external service 1025 (refer to FIG. 10, discussed in detail elsewhere herein) on the web services. One or more embodiments utilize the IPv6 address assigned to the device through the network management system or through the network operating system. After the mobile device is activated and authenticated to the network the network will allocate an IPv6 to that mobile device. The IPv6 is also known by the carrier app. In one or more embodiments, the carrier app uses the IPv6 address; it sends the IPv6 address to a carrier app registration server 1029 together with an application ID, as seen in step 1010. Again, as discussed elsewhere herein, in one or more embodiments, the IP address that is employed should be unique.

In one or more embodiments, the process of correlation between the cellular IPv6 address provided by the application and the IP address granted to the device by the network runs on the back-end systems and not on the mobile device. This advantageously allows secure validation of the device. After the device is identified, in step 1012, the back-end system responds to the application registration through a secure medium with a unique application ID—that is, in step 1012, the registration between the mobile app and its server is completed. The application stores this unique ID and uses it to identify both the device and the instance of the application, going forward. The unique ID preferably does not contain any device ID and is not part of a known device ID, such as the IMEI or the IMSI. This helps ensure the security and privacy of the users. Furthermore, regarding the secure medium, appropriate techniques include, for example, secure socket layer (SSL), encrypted tunnel, other known encryption techniques, and the like.

Advantageously, one or more embodiments are not dependent on device manufacturers; they can function where device manufacturers prevent the carrier app from determining device/subscriber information, and even when the carrier app cannot directly determine the IP address. Furthermore, one or more embodiments reduce the number of software functions needed on a carrier app. Indeed, one or more embodiments can implement functions on the carrier app, and can be implemented by the carrier on its own. In one or more embodiments, no interaction with the device manufacturer is needed; rather, improvements relate to the carrier app and how to register the carrier app, under the control of the wireless service provider. For example, the carrier app determines the IPv6 address from the phone, or even from an external service, and this IPv6 address is matched in the back end to permit determination of device/subscriber information.

Figure 10:
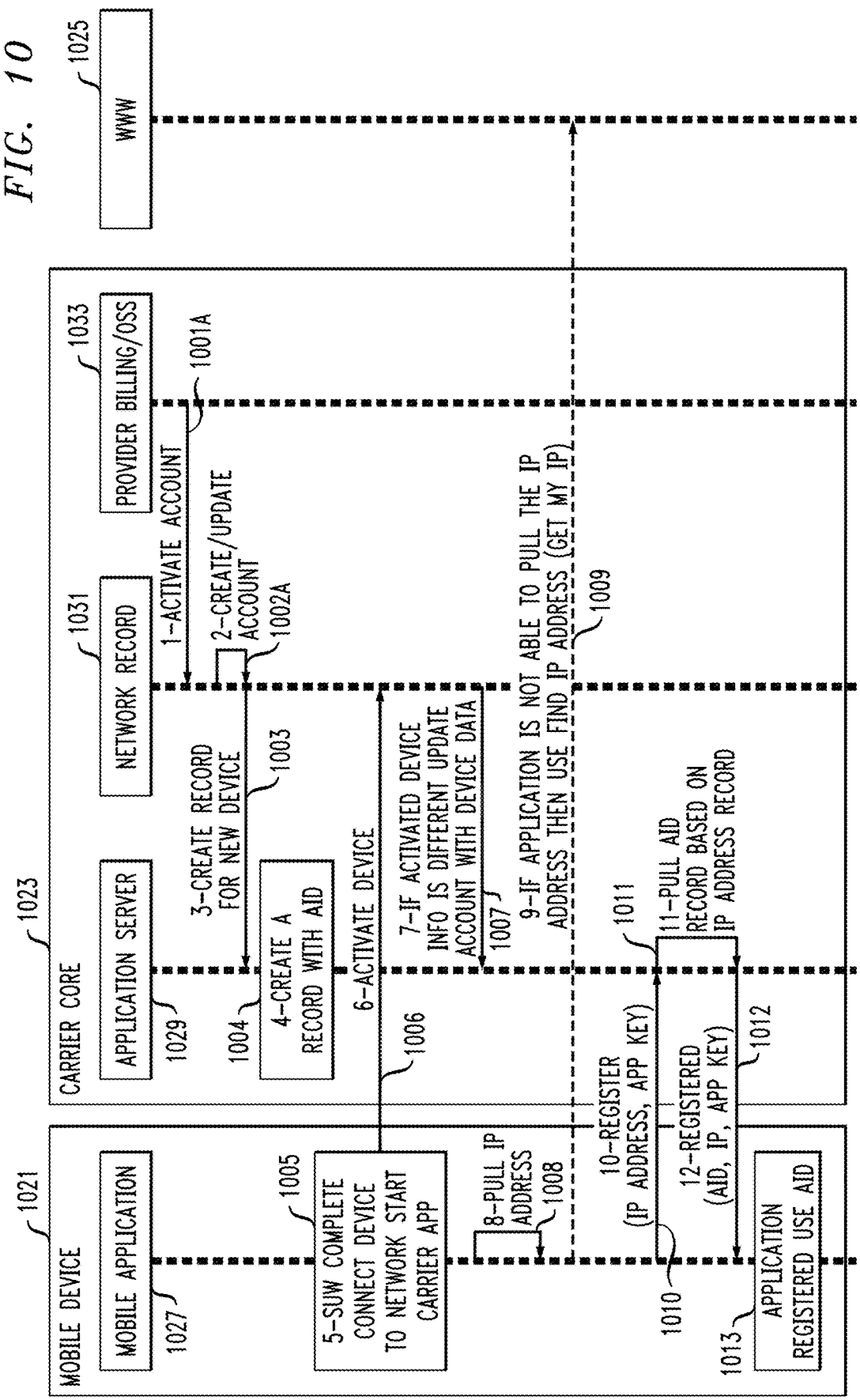
FIG. 10 is a combined data flow and block diagram, in accordance with an aspect of the invention.

Referring still to FIG. 10, in step 1001A, the user creates and activates an account with the service provider, and the service provider creates a record for the user that includes information on the user's mobile device, including device information. This information is available to the billing system, operations support system (OSS) 1033 and business support system (BSS) of the service provider. The OSS sends an activation request to the home subscriber server (HSS) or database (e.g., network record 1031) to enable the network to authenticate and authorize the mobile device.

In step 1002A, the network's home subscriber server (HSS) or database 1031 creates a user record that can be sent to the application server 1029. In step 1003, the user's record is sent to the carrier application backend server 1029 by application programming interface (API) to create the user's account record and to register the mobile device 1021 on the application server 1029. In step 1004, the application server 1029 creates a unique application identifier (AID) for each record and stores the account record for a period of time, anticipating the activation of the application. In step 1005, during the device's first Set Up Wizard (SUW) process, and after latching to the network, the set-up process invokes and starts the carrier application (this, in itself, is standard procedure for mobile operating systems).

Referring to step 1006, during the SUW step 1005, the device is activated on the network. If the user is using a different mobile device than the one registered on the network during account creation, the network captures the new device information and updates the back-end systems records 1031, 1029 with this new information. In step 1007, the network sends the update to the back-end application server 1029. Step 1007 this addresses a corner case where the user is using a different mobile device from that which was registered. As will be appreciated by the skilled artisan, during standard (e.g., 3GPP) activation of a mobile device, back-end systems obtain information such as IMEI, IMSI, and the like, and the back-end system can then update the app and/or record associated with the app (in general the application ID can be correlated with the back-end device information; both can have the identification—the network back-end and the application itself, or the application back-end instance). Step 1006 can include a standard mobile device activation with a network (e.g., 3GPP, 5G, LTE). The device is started and searches for, e.g., a public land mobile network (PLMN) network. If it finds a network it proceeds with registration and authentication, and submits all the device information to the network. Based on, for example, the 3GPP standard, the device will provide hard-coded IDs such as IMEI, IMSI, and the network will allow the device to latch/associate to the network. That information is stored in back-end network reference 1031. Through that mechanism, the device is identified through IMEI (device ID/serial number). When the device is changed, the IMEI will change. If the SIM card on the device is changed, the IMSI will change. The network record will know if devices or SIM cards are switched. Once the device successfully latches, the network record 1031 updates the app server 1029 regarding the new device/sim card.

In step 1008, the carrier application 1027 starts the registration process with the application server 1029, as indicated by the logical flow of the application. To complete the registration, the carrier application will extract the IPv6 of the device from the network configuration, in order to include it in the registration request. The author of the carrier app can select the details of the logical flow for registration and one or more embodiments can work with a wide variety of logical flows for app initiation.

Step 1009 is an exception handler. In case the mobile device's operating system does not allow the application to obtain the IPv6 of the device, then the application can query the IPv6 of the device from the back-end network systems or from an external public server on the Internet (generally, 1025). In step 1010, the carrier application 1027 sends a registration request to the application server 1029. The request includes the IPv6 of the mobile device and a public key of the app ("app Key") generated by the application from the application certificate. In step 1011, the application server uses the IPv6 address provided in the registration request to search for the AID in the database and to correlate the mobile device request with the AID.

In step 1012, if the application server is able to find a record that matches the IPv6 address provided in the registration request, then the application server sends a "registration success" acknowledgment to the application on the mobile device. This registration acknowledgment includes the AID, the IPv6 of the device, and the public key of the app ("app Key") (additional device information can be added to the registration success message as needed). In step 1013, the application is registered and the mobile device is identified. Going forward, the application uses the AID to identify the device or the application; the device includes the AID in its communications to the application server to identify the device. Note that the communication between the app and the application server is encrypted in one or more embodiments.

Thus, once the app is ready to register, it can be seen in 1008/1009 that the app starts registering by obtaining the IP address, and the public key of the app ("app Key") which are sent to the server 1029 in step 1010. Then, in step 1011, the app server pulls the user ID based on the IP address record. The correlation between when the app is registering and the record on the app server occurs via the IPv6 address—match the IPv6 address (generally static IP address) and the IPv6 address on record. In step 1012, send back "registration success," with a User ID, IP address, and send back the public key of the app ("app Key"). Then, the application is registered. Going forward, as per step 1013, the app will use the AID for registration and communication with the app server. In this way, it is possible to identify the application, the device, and the user, without reading anything other than the IPv6 of the device. As part of the application's secure communication with the server, in one or more embodiments, the application contains the public key of the server; in addition, the SSL key can be used in one or more embodiments.

Thus, by way of review, it will be appreciated that due to increasing security and privacy policies, critical applications have been prohibited from accessing the majority of device identifiers including IMEI, IMSI, and MAC address. This has been implemented by strict permissions. Applications, including carrier applications, need to uniquely identify the device to be able to provide services such as configuration and provisioning. One or more embodiments advantageously allow the mobile telephony provider to identify the device regardless of the permissions granted and without user intervention. It is believed that one or more embodiments are likely to have a very high success rate and to be compatible with device and service changes. Furthermore, one or more embodiments will benefit other applications on the mobile device by sharing the device ID from the carrier app to these other apps, in a seamless manner, and without conflicting with privacy and/or security policies. That is to say, for example, other apps that belong to the same carrier (e.g., so-called "Watch TV" apps, Internet apps, remote control apps, and the like) can communicate with each other if they have the same registration number. When an app is posted to Apple iOS or Google Android, or the like, a registration number is assigned and only apps with the same registration number can communicate with each other (thus obtaining the app ID which also leads to the device ID). Apps cannot communicate with other apps that are not registered with the same developer ID. So, in one or more embodiments, the carrier app cannot communicate with other apps that are not from the same carrier. The carrier app can share its AID with similar apps from the same carrier to facilitate authentication and enrolment to other services.

Still by way of review, the back-end system typically has the device's IPv6 address associated to that device (e.g., the IMEI thereof). The back-end system typically also knows essentially everything about the device, service, and user (e.g., the IMSI/IMEI and the name of the subscriber for the device, as well as the service level for the device/account associated with the device, and the manufacturer of the device). Furthermore in this regard, the information can include the device ID/physical ID of device, device identifiers, service level, subscriber account information—indeed, whatever information was submitted during device registration and latching is typically also shared with the app server. All this information is populated in the server 1029 in the back end. Steps 1001A, 1002A, and 1004 typically occur when the user (or, e.g., phone store technician) installs the SIM card and switches the device ON. Step 1003, for example, can be initiated upon activation of the SUW (set-up wizard). When the phone is opened for the first time, there are typically screens to select the language, date, and so on. One part of the setup wizard process is activation of the carrier app (this is standard for mobile devices, non-limiting examples of which are iOS® and Android®). When the carrier app is activated, it will look for the IP address of the device (which is available because the device is already connected to the network).

Furthermore, by way of review, in one or more embodiments, after the back-end system obtains the device or application ID, then in step 1002A it builds a record containing the device information; for example, IMEI, IMSI, and sends it to the application server for storage and future lookup. In step 1010, the device tells the app server the application ID and IP address; the corresponding IMEI and user account ID are all available on the app server 1029.

Referring to step 1009, if, in the future, OEMs/device manufacturers decide to block the app from reading the IP address, then the app can go to the app server or to the public internet to query its public IP address.

Figure 13:
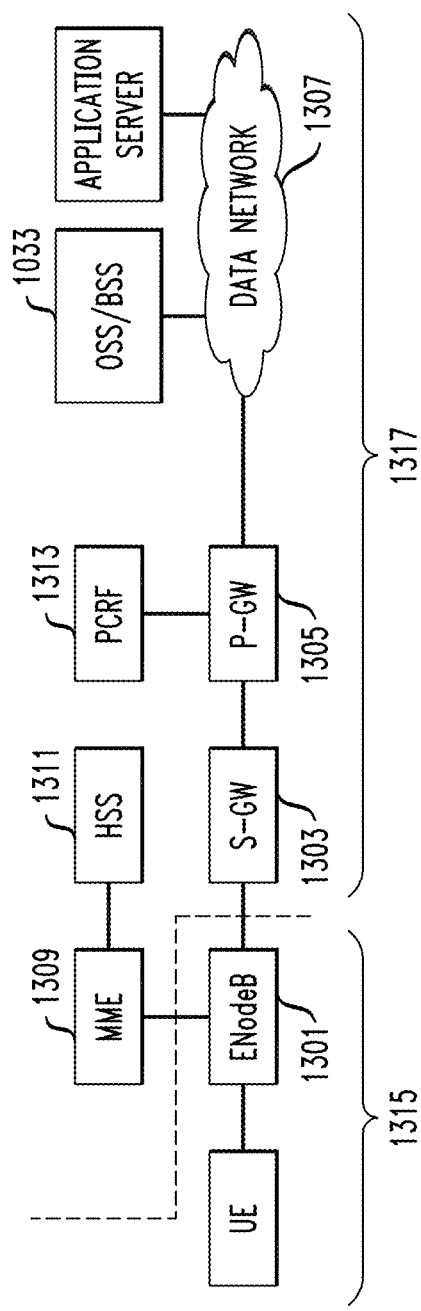
FIG. 13 shows aspects of the invention integrated with a 4G core.
Figure 14:
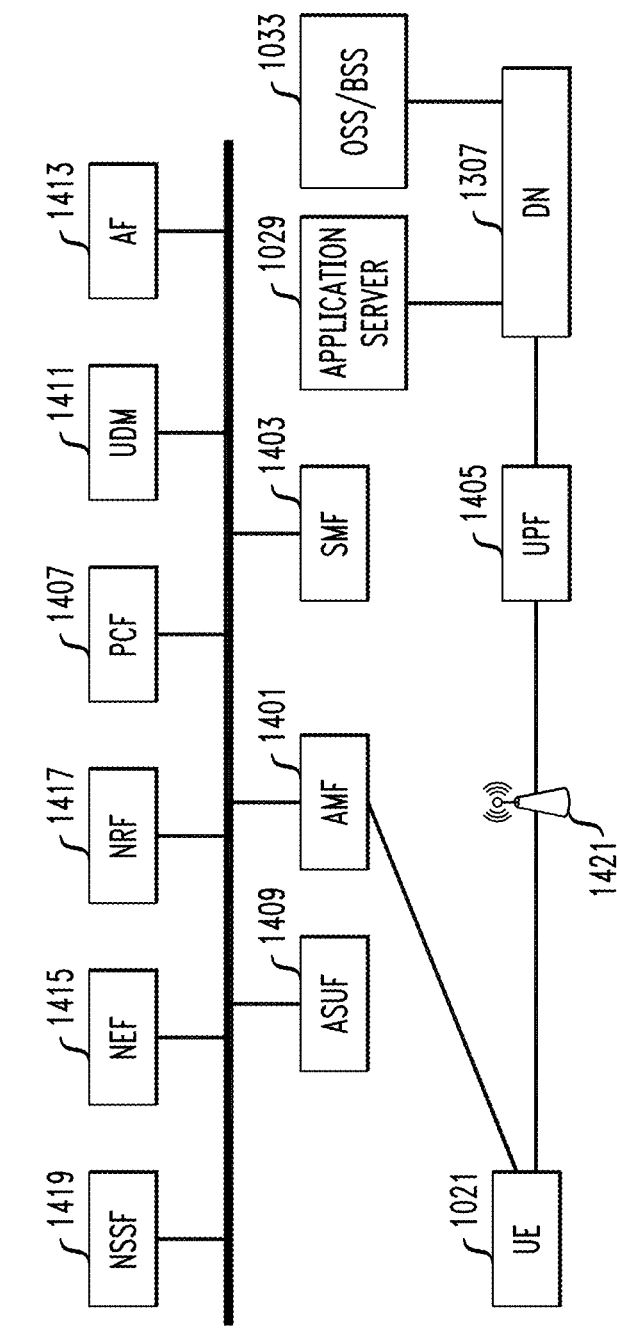
FIG. 14 shows aspects of the invention integrated with a 5G core.
Figure 15:
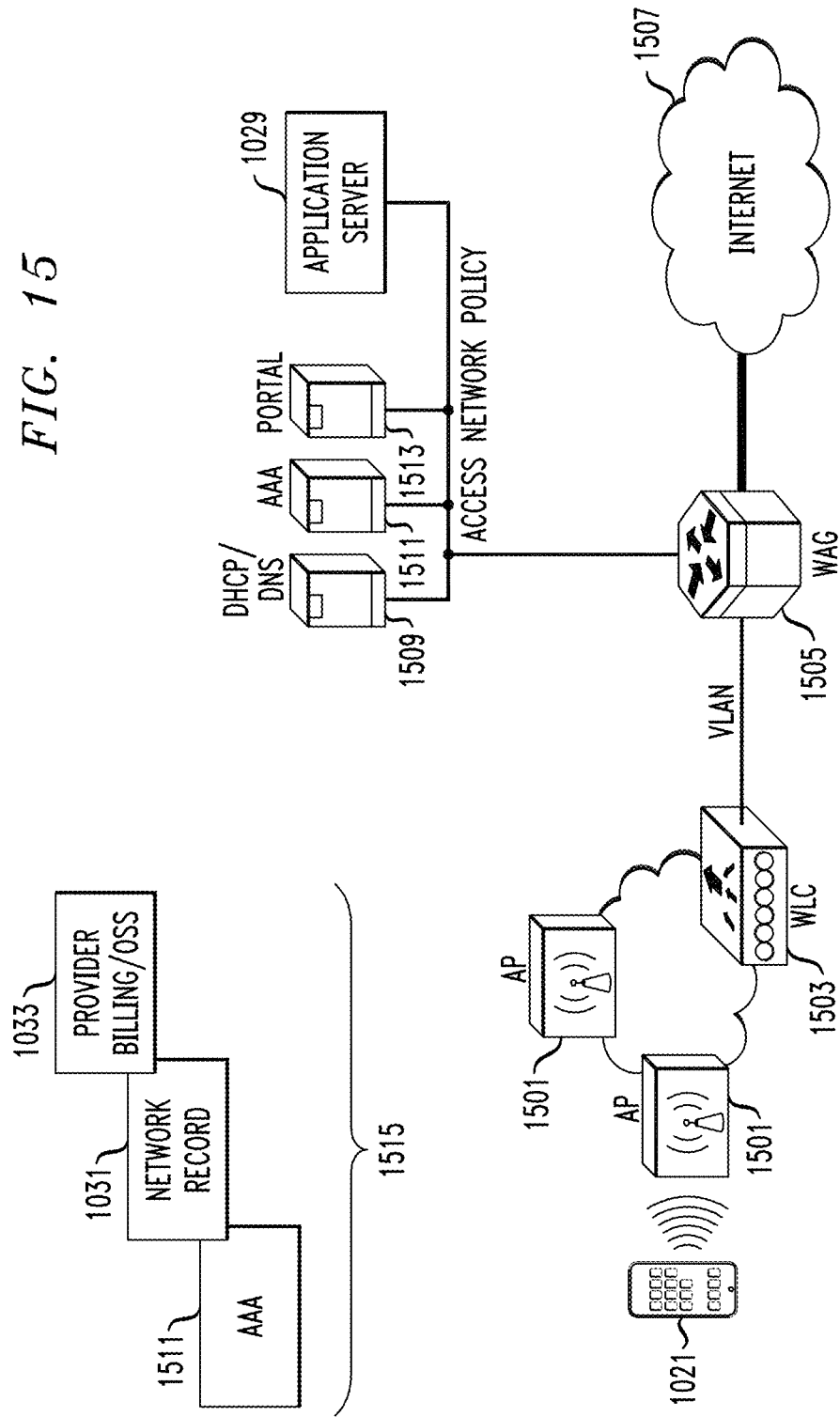
FIG. 15 shows aspects of the invention integrated with a Wi-Fi core.

In one or more embodiments, the application server 1029, the network record 1031, the provider billing/OS S 1033 are all part of the carrier core 1023 and under the control of the wireless carrier, and the carrier app 1027 is developed by the carrier and provided by the carrier to the manufacturer, who loads the carrier app onto the device before the device is provided to the end user. Web site 1025 that allows IPv6 lookup can be a third-party web site (e.g., whatismyipaddress dot com, where "." is rendered as "dot" to avoid including browser-executable code in the text of the patent application), or could be a system in the carrier's data center. Such web sites will text the user her or his IPv4 and/or IPv6 address. In one or more embodiments, within the carrier core 1023, communication is via wired connection (e.g., Ethernet/fiber/copper) in the service provider's plant. Between the mobile device 1021 and the core 1023, communication is typically wireless such as 4G/5G/Wi-Fi. Refer to FIGS. 13-15. In FIG. 10, the mobile app 1027 is an app (e.g., compiled or interpreted high-level code) that runs on the mobile device 1021. App server 1029 is a physical server which may or may not be virtualized; it includes appropriate software and stores record(s). Element 1031 is an electronic database; it can correspond, e.g., to a subscriber record—in LTE, this record is known as HSS (Home Subscriber Server) 1311 (see FIG. 13); in 5G, (UDM) Unified Data Management 1411 (see FIG. 14); in Wi-Fi, a subscriber database (behind the AAA server 1511—see FIG. 15 below). Element 1033 can be a suitable billing server such as BSS/OSS—it obtains device and subscriber information and sends/provisions that into the network, so that when the device registers to the network and wants to latch to the network, it can. Element 1033 provides the network database 1031 with device and subscriber information.

In one or more embodiments, a mobile device can be used in a private network (home SSID) or hot spot (public). One exemplary use case is to identify the mobile device across two networks (for example, the back-end systems will contain the application ID and will be able to correlate the application ID to other network and service identifiers—going forward, the carrier's networks can identify the device through the app ID either passively, by listening for the app ID, or actively, by engaging the app or the app's back end); the application ID can also be used in roaming scenarios as discussed elsewhere herein. This is possible, for example, for residential networks such as private in-home Wi-Fi networks (see FIG. 5). Some backend cable systems can take advantage of the registration to identify devices and apply policies accordingly.

It will be appreciated that one or more embodiments are of particular use for mobile carriers/mobile service providers, because they can identify the IPv6 address of the device and correlate it with the device and user records in the back end. For example, carriers such as MNOs and MVNOs will be able to advantageously utilize one or more embodiments. A mobile network operator (MNO), also known as a wireless service provider, wireless carrier, cellular company, or mobile network carrier, is a provider of wireless communications services that owns or controls all the elements necessary to sell and deliver services to an end user including radio spectrum allocation, wireless network infrastructure, back haul infrastructure, billing, customer care, provisioning computer systems and marketing and repair organizations.

Figure 11:
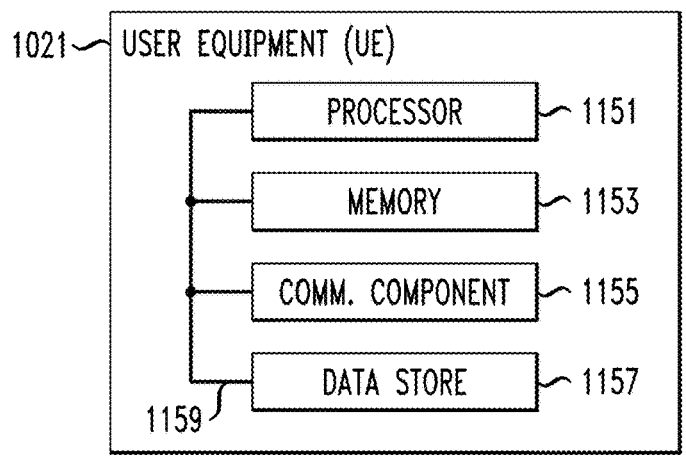
FIG. 11 is a block diagram of exemplary user equipment, according to an aspect of the invention.

FIG. 11 shows an exemplary configuration of a mobile device 1021 such as a mobile phone, cellular-enabled tablet, or cellular-enabled laptop, generally referred to as user equipment (UE). The UE includes a processor 1151 and associated memory 1153. Communications component 1155 includes, e.g., a cellular transceiver module coupled to the processor and having an antenna and appropriate circuitry to send and receive cellular telephone signals. Communications component 1155 optionally includes, e.g., a Wi-Fi transceiver module coupled to the processor and having an antenna and appropriate circuitry to allow the UE to connect to the Internet via a wireless network access point or hotspot. The skilled artisan will appreciate that "Wi-Fi" is a trademark of the Wi-Fi Alliance and the brand name for products using the IEEE 802.11 family of standards; these standards are well-known to the skilled artisan and have a definite meaning. Also included is a data store 1157 such as a suitable non-volatile memory (e.g., flash memory). Bus 1159 interconnects the elements in a well-known manner. In some instances, data store 1157 includes directories with different permissions for over-the-top versus carrier apps.

Figure 16:
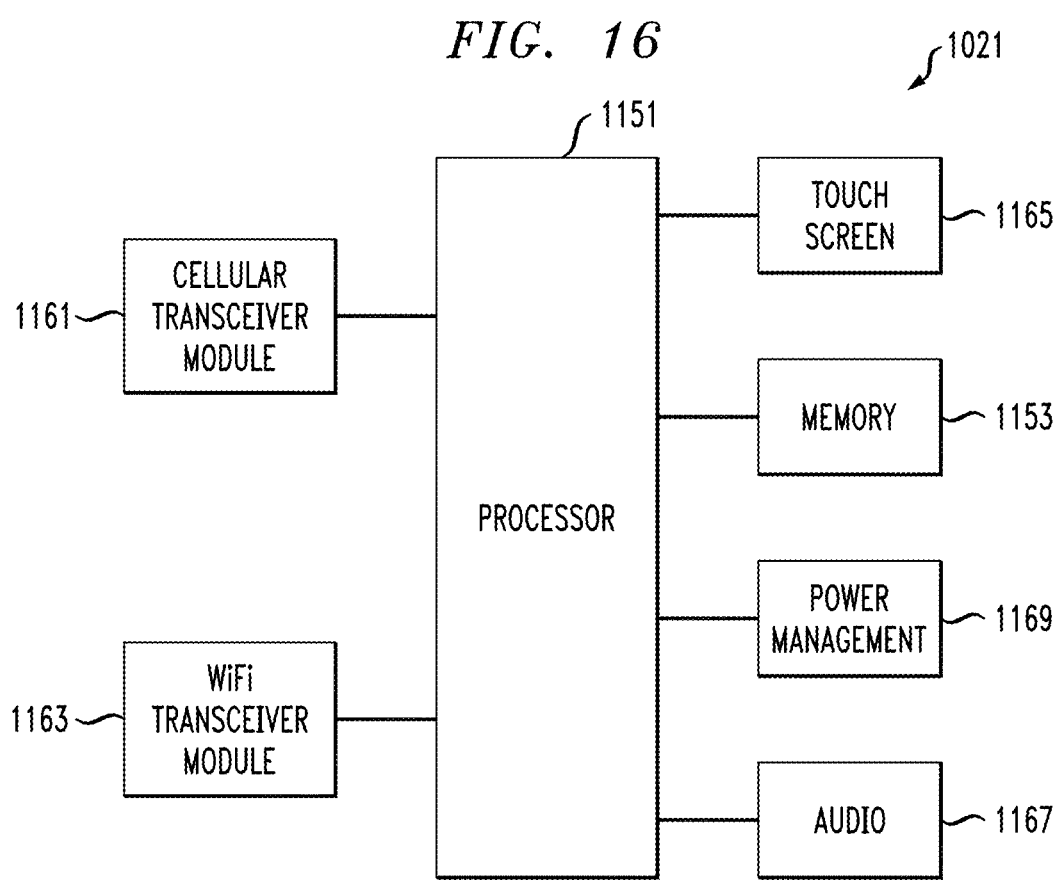
FIG. 16 is another block diagram of exemplary user equipment, according to an aspect of the invention.

FIG. 16 shows another exemplary configuration of a mobile device 1021 such as a mobile phone, cellular-enabled tablet, or cellular-enabled laptop, generally referred to as user equipment (UE). Device 1021 includes a suitable processor; e.g., a microprocessor 1151. A cellular transceiver module 1161 coupled to processor 1151 includes an antenna and appropriate circuitry to send and receive cellular telephone signals, e.g., 3G, 4G, or 5G. A Wi-Fi transceiver module 1163 coupled to processor 1151 includes an antenna and appropriate circuitry to allow phone 1021 to connect to the Internet via a wireless network access point or hotspot. Elements 1161, 1163 correspond, for example, to element 1155 in FIG. 11.

In one or more embodiments, one or more applications in memory 1153, when loaded into RAM or other memory accessible to the processor cause the processor 1151 to implement aspects of the functionality described herein.

Touch screen 1165 coupled to processor 1151 is also generally indicative of a variety of I/O devices, all of which may or may not be present in one or more embodiments. Memory 1153 is coupled to processor 1151. Audio module 1167 coupled to processor 1151 includes, for example, an audio coder/decoder (codec), speaker, headphone jack, microphone, and so on. Power management system 1169 can include a battery charger, an interface to a battery, and so on.

Figure 12:
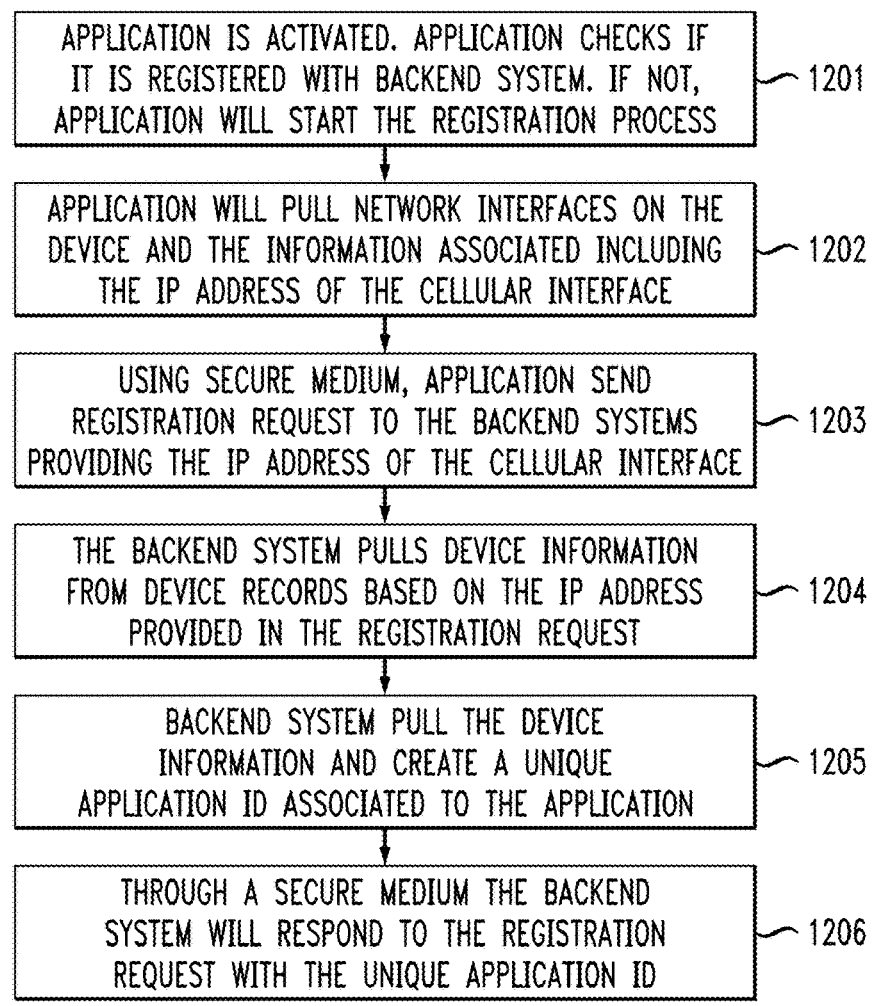
FIG. 12 is a flow chart of an exemplary method, in accordance with an aspect of the invention.

FIG. 12 presents a flow chart with an alternative view of the application registration process. In step 1201, the application 1027 is activated. The application checks if it is registered with the backend system. If not, the application will start the registration process. Compare to steps 1005, 1006, and 1007 in FIG. 10. In step 1202, the application 1027 pulls network interfaces on the device 1021 and the associated information including the IP address of the cellular interface. Compare to step 1008 in FIG. 10. In step 1203, using a secure medium, the application sends a registration request to the backend systems, providing the IP address of the cellular interface. Compare to step 1010 in FIG. 10.

In step 1204, the back-end system pulls device information from device records stored on the app server based on the IP address provided in the registration request. Compare to step 1011 in FIG. 10. In step 1205, the back-end system pulls the device information and creates a unique application ID associated to the specific application. Compare to step 1011 in FIG. 10. In step 1206, through a secure medium, the back-end system responds to the registration request with the unique application ID. Compare to step 1012 in FIG. 10. Note that in one or more embodiments, the backend system creates a unique application ID associated to the specific application as per 1205.

FIG. 13 shows aspects of the invention integrated with a 4G core. At a high level, the 4G network includes the 4G core network (CN) (EPC) 1317 and the access network E-UTRAN 1315. The CN includes many logical nodes. In the example depicted, the access network includes the evolved NodeB (eNodeB) 1301, which connects via wireless cellular telephony to the UEs 1021. In general, any and all suitable technology can be employed for NodeB; for example, eNodeB for 4G LTE and gNodeB for 5G. Each of these network elements is interconnected using standard interfaces known to the skilled artisan. The 4G core 1317 includes five main core functions. These include the Mobility Management Entity (MME) 1309 which provides mobility and session management to the User Equipment 1021. The Serving Gateway (S-GW) 1303 is responsible for exchanging the traffic between the P-GW 1305 and the access network 1315. The PDN Gateway (P-GW) 1305 is responsible for data traffic between S-GW 1303 and other networks such as the IMS or internet 1307. The P-GW assigns the IP address to the UE. The Home Subscriber Server (HSS) 1311 is responsible for storing the data for customer profile and creating authentication vectors that are sent to the MME; billing records are stored/provisioned in the HSS. The Policy and Charging Rules Functions (PCRF) 1313 are responsible for providing the information regarding QoS to the P-GW; this information may include, for example, charging rules, flow control rules, and traffic priority. The UE device info is available to/provisioned by the billing system/HSS 1311. Application server 1029 is connected to the IP network cloud 1307 (IMS=IP Multimedia Subsystem; PSS=Packet Switch Streaming). In one or more embodiments, the OSS/BSS 1033 are part of the data network and they are not included in the 4G and 5G core. The 1031 Network record can be part of the OSS/BSS 1033 and HSS 1311. Element 1033 in the example of FIG. 13 is connected to the data network 1307.

FIG. 14 shows aspects of the invention integrated with a 5G core. 5G core network functions will be familiar to the skilled artisan and include (abbreviations defined below) AMF 1401, SMF 1403, UPF 1405, PCF 1407, AUSF 1409, UDM 1411, AF 1413, NEF 1415, NRF 1417, and NSSF 1419. The Access and Mobility Management function (AMF) supports termination of NAS signaling, NAS ciphering and integrity protection, registration management, connection management, mobility management, access authentication and authorization, and security context management. The Session Management function (SMF) supports session management (session establishment, modification, release), UE IP address allocation and management, DHCP functions, termination of NAS signaling related to session management, DL data notification, traffic steering configuration for UPF for proper traffic routing. The User plane function (UPF) supports packet routing and forwarding, packet inspection, QoS handling, acts as external PDU session point of interconnect to Data Network (DN), and is an anchor point for intra- and inter-RAT mobility. The Policy Control Function (PCF) supports unified policy framework, provides policy rules to CP functions, and access subscription information for policy decisions in UDR. The Authentication Server Function (AUSF) acts as an authentication server. The Unified Data Management (UDM) supports generation of Authentication and Key Agreement (AKA) credentials, user identification handling, access authorization, subscription management. The Application Function (AF) supports application influence on traffic routing, accessing NEF, interaction with policy framework for policy control. The Network Exposure function (NEF) supports exposure of capabilities and events, secure provision of information from external application to 3GPP network, and translation of internal/external information. The NF Repository function (NRF) supports service discovery function, maintains NF profile and available NF instances. The Network Slice Selection Function (NSSF) supports selecting of the Network Slice instances to serve the UE, determining the allowed NSSAI, and determining the AMF set to be used to serve the UE.

In the 5G core network of FIG. 14, PCF 1407 is analogous to PCRF 1313 of FIG. 13; UDM 1411 and AUSF 1409 are analogous to HSS 1311; AMF 1401 and SMF 1403 are analogous to P-GW and S-GW 1305, 1303; and UPF 1405 is analogous to P-GW and S-GW 1305, 1303. Furthermore in this regard, with respect to P-GW and S-GW, a distinction can be made between PGW-C and SGW-C on the one hand, and PGW-U and SGW-U on the other hand; -C refers to control and -U to user.

In FIG. 14, the UPF 1405 anchors the UE IP addresses. This is because of static IP; it is the UPF that assigns the IP and in dynamic IP address, it is the SMF. However, the anchor is the UPF. Note cellular wireless telephony link 1421 between the UE 1021 and UPF 1405. UDM 1411 (and HSS 1311 in FIG. 13) carry information such as IMSI IMEI and optionally IP address. App server 1029 is implemented as a back-end server (e.g., in a cloud implementation) connected to data network 1307. Provider billing/OSS element 1033 is implemented as a back-end server that provisions the UPF and is connected to data network 1307.

FIG. 15 shows aspects of the invention integrated with a Wi-Fi core. The Wi-Fi core includes APs (access points) 1501; WLC (wireless controller) 1503 which controls access point configuration; and WAG (wireless access gateway) 1505. When the device 1021 latches to the network, it will request an IP address from the DHCP server 1509. The DHCP will grant the host 1021 an IP address, and then the host will authenticate using the (AAA=authorization, authentication, and accounting) server 1511. The AAA server 1511 advises the WAG 1505 whether authentication is successful, and if the device is authorized to use the Internet service. If successful, the device 1021 is allowed to access the Internet 1507. If not successful, the device is attached to the AP 1501 but can't access the Internet 1507; rather, the device can only link to the portal 1513 to register, purchase services, or enter a new user name and password. As seen in detailed view 1515, network record 1031 is attached to AAA server 1511. Provider billing/OSS element 1033 is a database attached to/behind the AAA server; the AAA server uses that database to authenticate the user and credentials. App server 1029 can be located, as shown, adjacent portal 1513 networked to elements 1509, 1511, 1513, or behind the Internet 1507.

Recapitulation

Given the discussion thus far, it will be appreciated that, in general terms, an exemplary method, according to an aspect of the invention, includes the step 1010 of obtaining, at a core system 1023 of a carrier, from a carrier application 1027 on a mobile device 1021 of a subscriber of the carrier, a registration request including a unique internet protocol address of the mobile device and a public key generated by the carrier application from an application certificate of the carrier application. A further step 1011 includes, based on the unique internet protocol address, the core system accessing a database record to retrieve a unique application identifier (AID) corresponding to the unique internet protocol address of the mobile device. Still a further step 1012 includes sending, from the core system of the carrier, to the carrier application on the mobile device of the subscriber of the carrier, a registration request response including the unique application identifier and the public key. The unique address can be permanent or temporary, but should be unique within the network (no two mobile devices should have the same internet protocol address, so that the network will know which device has the address provided by the app). The address can be IPv6 or a unique IPv4, for example. In one or more embodiments, the app server will generate a unique ID for the carrier application (application ID) (AID); the application will receive this AID and store it to identify itself to the core servers going forward.

In one or more embodiments, in the sending step, the registration request response further includes the unique internet protocol address of the mobile device. In one or more embodiments, the IP address and key are sent back in case the IP lease expires, in which case the phone can get a new IP at any time; this sending back of the IP address ensures that the application can restart the registration process if the IP address does not match.

One or more embodiments further include the carrier application on the mobile device determining the unique internet protocol address while being blocked from reading identifying information from the mobile device. Refer to step 1009; the app can seek the information from the core if on a trusted network, or else, if roaming, the app can obtain the information from the web as at 1025. One or more instances thus further include the carrier application on the mobile device obtaining the unique internet protocol address from an external service 1025 while being blocked from reading the unique internet protocol address from the mobile device. In one or more embodiments, the registration request is formulated after the information is obtained.

In some cases, in the obtaining step, the unique internet protocol address includes an IPv6 address.

In one or more embodiments, the core system creates the database record as per step 1002A.

The obtaining and sending steps can be carried out via Wi-Fi or via wireless cellular telephony; the carrier can be a mobile telephony carrier.

In one or more embodiments, a further step includes, subsequent to sending the registration request response to the carrier application on the mobile device, using the unique application identifier to identify the carrier application, the mobile device, the subscriber, and a service level (e.g., tier of services (bandwidth, speed, and time duration), extra over the top services to the mobile device) of the subscriber. That is to say, operate the device going forward (after registration) with the AID. The next time the device 1021 goes on the web, and the app is running, the app, going forward, uses that AID to identify the app, the device, and the service and user. The AID correlates to all that information in the back-end system (core 1033). The app itself does not need to know the device type, user, or operating system (OS); it just uses the AID which correlates to the information in the back end.

Thus, by way of review, in the registration process, the app server 1029 passes the AID plus the app key. The AID is used in the future to identify the device. Going forward, the AID is unique to the carrier app on the device 1021. The AID is given by app server 1029 to that specific app 1027, and, going forward, the AID is used to identify the device 1021. The next time the user logs on, after a successful registration, when the device latches to the network, the device can be identified by the AID. The app 1027 can determine which network it is connected to and will communicate with the app server 1029 using the AID. There are two ways to do this, for example, passive and active. In the passive approach, the network listens for registration via the app server 1029 and extracts the AID. In the active approach, the network actively asks the app server 1029 which device/AID is being used. Furthermore in this regard, in one or more embodiments, the network listens for the carrier application registration request sent from the app to the application server. The network retrieves the AID, either from the data traversing the network or by requesting the AID from the application server after noticing the registration request (through the source IP; that is, the network can ask the application server for the AID using the device's IP address).

In some cases, the above-described use of the AID can be done even when the device is roaming. For example, the device is on a different network; at that time, the app will associate the network information on the device and send it to the back end. For example, suppose the device is in a roaming environment and it is desired to set up service levels—the roaming partner authenticates with the home provider and the home provider advises the roaming partner what service(s) to implement based on the app ID. Thus, after authentication, the app can communicate with the (home) network and the (home) network sends back to the roaming partner appropriate policies and the like. Thus, in one or more embodiments, the Home network can send to the visiting network either change of authority COA or update policy rules.

One or more embodiments further include, subsequent to sending the registration request response to the carrier application on the mobile device, using the unique application identifier to authorize at least one of policies and services (e.g., service level discussed above) on the mobile device. For example, allow access to Wi-Fi, TV, streaming, and the like.

One or more embodiments further include the core system of the carrier assigning the unique internet protocol address to the mobile device during an initial account activation step 1002A. The unique internet protocol address information is entered into the database and can later be matched with the unique internet protocol address received at 1010. After the device registers and authenticates, the network itself assigns to the device an IP address. The device obtains that IP address from the network. Step 1003 includes creation of a record; part of the record includes the IP address that was given to that specific device.

In one or more embodiments, in the obtaining step, the core system 1023 includes an application server 1029, a network record database 1031 coupled to the application server, and a billing server such as 1033 coupled to the network record database; the registration request is obtained at the application server; the database record is accessed in the network record database; the registration request response is sent from the application server; and the unique internet protocol address is assigned by the network record database.

In another aspect, an exemplary system (e.g., including 1023 and optionally 1021) includes a memory 730; and at least one processor 720, coupled to the memory, and operative to obtain, from a carrier application 1027 on a mobile device 1021 of a subscriber, a registration request including a unique internet protocol address of the mobile device and a public key generated by the carrier application from an application certificate of the carrier application; based on the unique internet protocol address, access a database record to retrieve a unique application identifier corresponding to the unique internet protocol address of the mobile device; and send, to the carrier application on the mobile device of the subscriber, a registration request response including the unique application identifier and the public key. In one or more embodiments, the registration request response further includes the unique internet protocol address of the mobile device. In some instances, the system further includes the mobile device 1021 of the subscriber. The carrier core and the mobile device are configured to carry out any one, some, or all of the method steps described herein.

One or more embodiments further include a Wi-Fi transceiver (e.g., access point 1501 controlled by controller 1503) coupled to the at least one processor; the at least one processor obtains the registration request and sends the response via the Wi-Fi transceiver (see also element 1163 in FIG. 16).

One or more embodiments further include a cellular transceiver (see, e.g., element 1421 in FIG. 14 and analogous cellular wireless telephony elements in FIG. 13) coupled to the at least one processor; the at least one processor obtains the registration request and sends the response via the cellular transceiver (see also element 1161 in FIG. 16).

As alluded to above, in one or more embodiments, the memory and the at least one processor include an application server 1029, a network record database 1031 coupled to the application server, and a billing server 1033 coupled to the network record database. For example, there are multiple processors implementing these elements. In such embodiments, for example, the registration request is obtained at the application server; the database record is accessed in the network record database; the registration request response is sent from the application server; and the unique internet protocol address is assigned by the network record database.

In another aspect, an exemplary system includes an application server 1029; a network record database 1031 coupled to the application server; and a billing server 1033 coupled to the network record database. Referring to step 1002A, the network record database is configured to assign a unique internet protocol address to a mobile device 1021 of a subscriber. Referring to step 1010 the application server is configured to obtain, from a carrier application on a mobile device of a subscriber, a registration request including the unique internet protocol address of the mobile device and a public key generated by the carrier application from an application certificate of the carrier application. Referring to step 1011, the application server is configured to, based on the unique internet protocol address, access a database record in the network record database to retrieve a unique application identifier corresponding to the unique internet protocol address of the mobile device. Referring to step 1012, the application server is configured to send, to the carrier application on the mobile device of the subscriber, a registration request response including the unique application identifier and the public key.

In some instances, the registration request response further includes the unique internet protocol address of the mobile device.

In one or more embodiments, the application server, the network record database, and the billing server form at least a portion of a carrier core 1023, and the system further includes the mobile device 1021, with the carrier application 1027. In this aspect, the carrier application is configured, subsequent to the application server sending the registration request response to the carrier application on the mobile device (step 1012), to use (step 1013) the unique application identifier to identify the carrier application and the mobile device to the carrier core.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
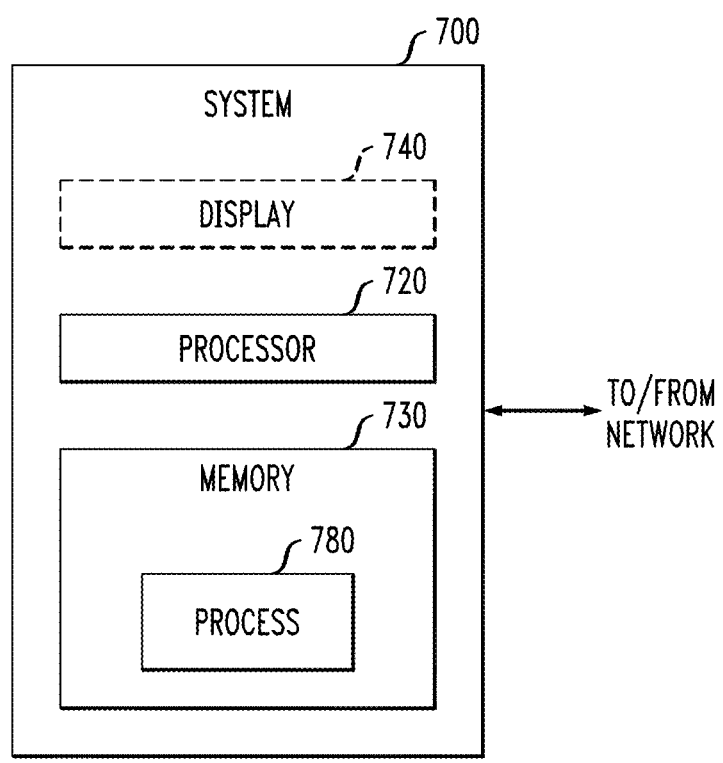
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

obtaining, at a core system of a carrier, from a carrier application on a mobile device of a subscriber of said carrier, a registration request including a unique internet protocol address of said mobile device and a public key generated by said carrier application from an application certificate of said carrier application;

based on said unique internet protocol address, said core system accessing a database record to retrieve a unique application identifier corresponding to said unique internet protocol address of said mobile device; and sending, from said core system of said carrier, to said carrier application on said mobile device of said subscriber of said carrier, a registration request response including said unique application identifier and said public key.

2. The method of claim 1, wherein, in said sending step, said registration request response further includes said unique internet protocol address of said mobile device.

3. The method of claim 2, further comprising said carrier application on said mobile device determining said unique internet protocol address while being blocked from reading identifying information from said mobile device.

4. The method of claim 2, wherein, in said obtaining step, said unique internet protocol address comprises an IPv6 address.

5. The method of claim 2, further comprising said carrier application on said mobile device obtaining said unique internet protocol address from an external service while being blocked from reading said unique internet protocol address from said mobile device.

6. The method of claim 2, further comprising said core system creating said database record.

7. The method of claim 2, wherein said obtaining and sending steps are carried out via Wi-Fi.

8. The method of claim 2, wherein said carrier comprises a mobile telephony carrier, and wherein said obtaining and sending steps are carried out via wireless cellular telephony.

9. The method of claim 2, further comprising, subsequent to sending said registration request response to said carrier application on said mobile device, using said unique application identifier to identify said carrier application, said mobile device, said subscriber, and a service level of said subscriber.

10. The method of claim 9, wherein using said unique application identifier to identify said carrier application, said mobile device, said subscriber, and said service level of said subscriber is carried out while said mobile device is roaming.

11. The method of claim 2, further comprising, subsequent to sending said registration request response to said carrier application on said mobile device, using said unique application identifier to authorize at least one of policies and services on said mobile device.

12. The method of claim 2, further comprising said core system of said carrier assigning said unique internet protocol address to said mobile device during an initial account activation step.

13. The method of claim 12, wherein:

in said obtaining step, said core system comprises an application server, a network record database coupled to said application server, and a billing server coupled to said network record database;

said registration request is obtained at said application server;

said database record is accessed in said network record database;

said registration request response is sent from said application server; and said unique internet protocol address is assigned by said network record database.

14. A system comprising:

a memory; and at least one processor, coupled to said memory, and operative to:

obtain, from a carrier application on a mobile device of a subscriber, a registration request including a unique internet protocol address of said mobile device and a public key generated by said carrier application from an application certificate of said carrier application;

based on said unique internet protocol address, access a database record to retrieve a unique application identifier corresponding to said unique internet protocol address of said mobile device; and send, to said carrier application on said mobile device of said subscriber, a registration request response including said unique application identifier and said public key.

15. The system of claim 14, wherein said registration request response further includes said unique internet protocol address of said mobile device.

16. The system of claim 15, further comprising said mobile device of said subscriber, wherein said carrier application on said mobile device is configured to determine said unique internet protocol address while being blocked from reading identifying information from said mobile device.

17. The system of claim 15, further comprising said mobile device of said subscriber, wherein said carrier application on said mobile device is configured to obtain said unique internet protocol address from an external service while being blocked from reading said unique internet protocol address from said mobile device.

18. The system of claim 15, wherein said unique internet protocol address comprises an IPv6 address.

19. The system of claim 15, wherein said at least one processor is further operative to create said database record.

20. The system of claim 15, further comprising a Wi-Fi transceiver coupled to said at least one processor, wherein said at least one processor obtains said registration request and sends said response via said Wi-Fi transceiver.

21. The system of claim 15, further comprising a cellular transceiver coupled to said at least one processor, wherein said at least one processor obtains said registration request and sends said response via said cellular transceiver.

22. The system of claim 15, further comprising, subsequent to sending said registration request response to said carrier application on said mobile device, using said unique application identifier to identify said carrier application, said mobile device, said subscriber, and a service level of said subscriber.

23. The system of claim 22, wherein using said unique application identifier to identify said carrier application, said mobile device, said subscriber, and said service level of said subscriber is carried out while said mobile device is roaming.

24. The system of claim 15, further comprising said mobile device of said subscriber, wherein said mobile device of said subscriber is configured to authorize at least one of policies and services on said mobile device.

25. The system of claim 15, wherein said at least open processor is further operative to assign said unique internet protocol address to said mobile device during initial account activation.

26. The system of claim 25, wherein:
said memory and said at least one processor comprise an application server, a network record database coupled to said application server, and a billing server coupled to said network record database;
said registration request is obtained at said application server;
said database record is accessed in said network record database;
said registration request response is sent from said application server; and
said unique internet protocol address is assigned by said network record database.

27. A non-transitory computer readable medium comprising computer executable instructions which when executed by a computer cause the computer to perform a method comprising:
obtaining, at a core system of a carrier, from a carrier application on a mobile device of a subscriber of said carrier, a registration request including a unique internet protocol address of said mobile device and a public key generated by said carrier application from an application certificate of said carrier application;
based on said unique internet protocol address, said core system accessing a database record to retrieve a unique application identifier corresponding to said unique internet protocol address of said mobile device; and
sending, from said core system of said carrier, to said carrier application on said mobile device of said subscriber of said carrier, a registration request response including said unique application identifier and said public key.

28. The computer readable medium of claim 27, wherein, in said sending step of said method, said registration request response further includes said unique internet protocol address of said mobile device.

29. The computer readable medium of claim 28, wherein said method further comprises, subsequent to sending said registration request response to said carrier application on said mobile device, using said unique application identifier to identify said carrier application, said mobile device, said subscriber, and a service level of said subscriber.

30. A system comprising:
an application server;
a network record database coupled to said application server; and
a billing server coupled to said network record database;
wherein:
said network record database is configured to assign a unique internet protocol address to a mobile device of a subscriber;
said application server is configured to obtain, from a carrier application on a mobile device of a subscriber, a registration request including said unique internet protocol address of said mobile device and a public key generated by said carrier application from an application certificate of said carrier application;
said application server is configured to, based on said unique internet protocol address, access a database record in said network record database to retrieve a unique application identifier corresponding to said unique internet protocol address of said mobile device; and
said application server is configured to send, to said carrier application on said mobile device of said subscriber, a registration request response including said unique application identifier and said public key.

31. The system of claim 30, wherein said registration request response further includes said unique internet protocol address of said mobile device.

32. The system of claim 31:
wherein said application server, said network record database, and said billing server form at least a portion of a carrier core;
further comprising said mobile device, with said carrier application;
wherein said carrier application is configured, subsequent to said application server sending said registration request response to said carrier application on said mobile device, to use said unique application identifier to identify said carrier application and said mobile device to said carrier core.

* * * * *